S. PETTY.
Mechanical Calculator.

No. 221,186. Patented Nov. 4, 1879.

Witnesses
D. B. Lawler
Will B. Schwartz

Inventor
Solomon Petty
per J. L. Boone
Attorney

UNITED STATES PATENT OFFICE.

SOLOMON PETTY, OF VOLCANO, CALIFORNIA.

IMPROVEMENT IN MECHANICAL CALCULATORS.

Specification forming part of Letters Patent No. 221,186, dated November 4, 1879; application filed November 20, 1878.

*To all whom it may concern:*

Be it known that I, SOLOMON PETTY, of Volcano, Amador county, California, have invented an Improved Mechanical Calculator; and I do hereby declare that the following is a full, clear, and exact description of the same, reference being had to certain drawings forming a part of this specification.

My invention has reference to an improved mechanical calculator for computing the result, by multiplication or division, of any two numerals of the order of units or fractions of units.

My calculator is arranged in a very simple manner, and is especially adapted for counting-house and office purposes, although it can be used in any place and for all purposes for computing numbers where a ready and correct calculator is useful.

Figure 1:
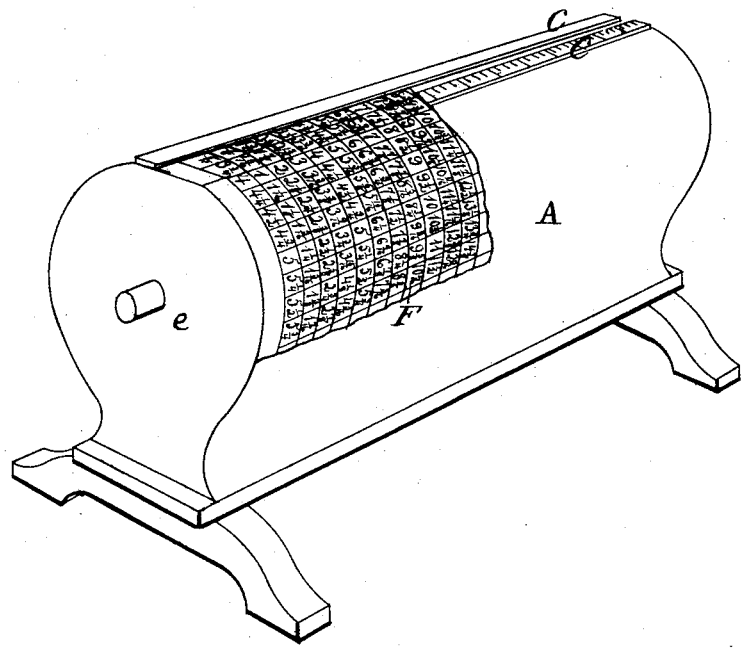
Figure 2:
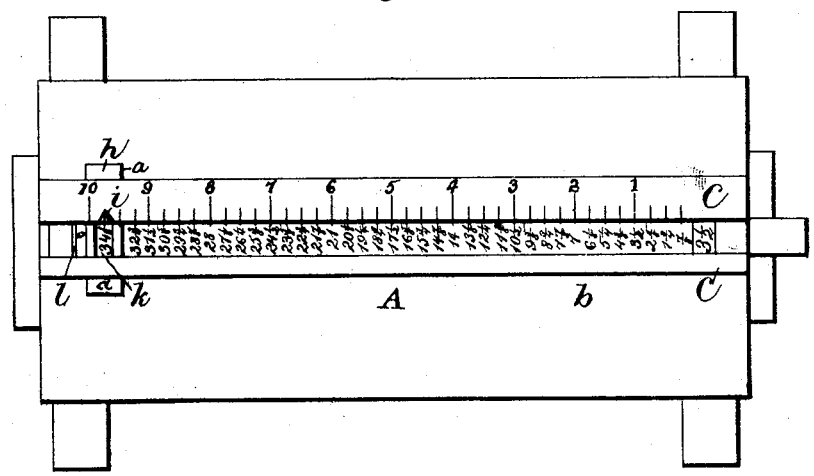

Referring to the accompanying drawings, Figure 1 is a perspective view with a part of case broken away to show cylinder. Fig. 2 is a plan view.

A is a cylindrical case or shell, which is mounted upon suitable end supports $e$, as represented. A slot, $b$, is made along the top of this case or shell, extending longitudinally from one end to the other, and along each edge of this slot a metal or other plate, C, is secured, by means of rivets or other fastening, at each end, leaving the intermediate portion unattached. One of these plates (preferably the one on the right hand) is graduated or marked with a scale representing ten whole numbers, and the space between each two whole numbers is marked off into four divisions, representing fourths of whole numbers, so that the scale or plate is divided into fourths, the whole numbers only being indicated by figures.

Inside of the case or shell I mount a cylinder, F, upon journals which bear in the center of the heads of the shell or case A, so that it can rotate freely inside of the case. One of the journals projects outward from the head of the case, and may have a crank attached to it for the purpose of conveniently rotating the cylinder. The surface of this cylinder I divide off into as many longitudinal columns or spaces as there are spaces on the graduated plate C, each space being of the same width as the slot $b$ in the case.

At one end of the cylinder (preferably at the crank end) I make a mark entirely around it at a short distance—say half an inch—from its end, and in the space thus formed and between the lines of the longitudinal spaces I mark, print, stamp, or engrave, consecutively, the fractions, mixed numbers, or integers which the column is to represent—that is to say, taking one of the longitudinal spaces for a starting-point, I indicate the fraction $\frac{1}{4}$ in the end space. This I call the "foot-number." I then indicate by figures placed in the longitudinal column, opposite each mark or graduation of the scale C, the multiple of the foot-number, and the fraction, mixed number, or integer which the graduation or mark represents.

$h$ (see Fig. 2) is a plate provided with projections $a$ at its ends and a central slot or opening, $k$. The plates C are attached to the casing only at their ends by screws passing through them and into the heads or ends of the casing A, and the plate $h$ is placed under the plates C, whereby the former may be slid back and forth without impediment under the plates C.

The plate $h$ is centrally slotted, to allow the numbers on the cylinder to be read, and the pointer $i$ on the plate $h$ to be bent over the graduation on one of the plates C.

The projections $a\,a$ are flanges projecting upwardly from the plate $h$, which serve the double purpose of guiding the plate $h$ and keeping it in place as it is slid back and forth under the plates C and as handles for operating it.

It will now be seen that if I want to multiply any number indicated on the scale by the foot-number $\frac{1}{4}$, all I have to do is to move the slide until its pointer is opposite that number, and the product will be seen through the opening $k$.

The foot-number of the next column is $\frac{1}{2}$, and I deduce the column of figures for its longitudinal space by the same multiplication process.

The next foot-number is $\frac{3}{4}$, and its column is produced in the same way, and so on around the cylinder until all the columns are filled in the same way with multiples of the foot and scale numbers.

Now it will be seen that if I wish to multiply one of the foot-numbers by one of the scale-numbers, all I have to do is to rotate the cylinder until the desired foot-number appears in the slot; then by moving the slide until its pointer is opposite the multiplicand on the scale-plate the result or multiple will be indicated through the opening $k$. For instance, given the example "If A buys three and one-half pounds sugar at nine and three-fourths cents per pound, what does he pay for the sugar?" to find the answer I rotate the cylinder until the foot-number $3\frac{1}{2}$ is brought opposite the slot in the case. I then move the slide until its pointer is opposite the $9\frac{3}{4}$ mark on the scale-plate, and the result, $34\frac{1}{8}$, is shown through the opening in the slide. If I wish to divide the thirty-four and one-eighth by three and one-half, I move the slide until its opening is over the $34\frac{1}{8}$, or number to be divided, and the pointer will be opposite the $9\frac{3}{4}$, which is the dividend; or, in other words, the column-numbers indicate the multiples of the foot-numbers, while the scale-numbers indicate the dividends of the column and foot numbers.

This arrangement is quite simple and easily understood, so that any person can make correct computations in an instant's time.

To steady the cylinder and prevent it from being displaced when it is once set, I arrange a spring, $l$, to press upon its end, (preferably its rear end.) This spring is attached at its lower end to one of the heads of the casing A, and bears against the cylinder F at its upper end, to retain it in any desired position, and projects through the slot at $o$, so that the operator can, by pressing it back at $o$ with his thumb, allow the cylinder to rotate freely until the desired column of figures has been brought opposite the slot, when, by freeing it, it will press against the cylinder and hold it in place.

I am aware that a sliding index-pointer is not new, broadly, and that a spring has heretofore been employed to hold a cylinder in place, and I therefore lay no claim, broadly, to such devices.

Having thus described my invention, what I claim, and desire to secure by Letters Patent, is—

In a mechanical calculator, the combination of the revolving cylinder F, provided with longitudinal and circular columns of figures, arranged as set forth, an outer casing, A, having a longitudinal slot, stationary plates C, one of which is graduated, and both of which are attached to the casing only at their ends, centrally-slotted plate $h$, having pointer $i$ and handles $a$, and spring-brake $l$, having thumb-piece $o$, all constructed and arranged to operate in the manner and for the purpose set forth.

In witness whereof I have hereunto set my hand and seal.

SOLOMON PETTY. [L. S.]

Witnesses:
ROBERT STEWART,
L. McLAINE.